UNITED STATES PATENT OFFICE.

JOHANN C. FRIEDRICHS, OF JERSEY CITY, NEW JERSEY.

IMPROVEMENT IN COMPOUNDS FOR FORMING LETTERS, FIGURES, OR ORNAMENTS.

Specification forming part of Letters Patent No. 217,360, dated July 8, 1879; application filed May 7, 1879.

*To all whom it may concern:*

Be it known that I, JOHANN C. FRIEDRICHS, of Jersey City, in the State of New Jersey, have invented a new and useful Compound for Letters, Figures, or Ornaments, which compound is fully described in the following specification.

This invention relates to that class of compounds used to make articles pressed in a form or die, and which are exposed to the atmosphere; and it consists in a composition formed by mixing umber, plaster-of-paris, clay, boiled oil, spirits of turpentine, terra-sienna, Japan drier, and litharge.

To prepare the compound, take half a pound of umber, one-quarter of a pound of litharge, five pounds of plaster-of-paris, one pound of clay, one-quarter of a pound of terra-sienna, two pounds of boiled oil, one pound of spirits of turpentine, and half a pound of Japan drier. Grind the solids to a fine powder, and then mix all the ingredients well together. This composition is then pressed into the form of the figure, letter, or other ornament desired to be made, and then baked in an oven, when the same is ready for use.

Articles made by this compound can be exposed to all temperatures, and, as the composition is very cheap, large as well as small articles may be formed of the same, and are well adapted for sign-letters and ornaments for the exterior of buildings.

What I claim is—

A compound consisting of umber, plaster-of-paris, clay, boiled oil, spirits of turpentine, terra-sienna, Japan drier, and litharge, in about the proportions specified, substantially as and for the purpose described.

JOHANN C. FRIEDRICHS.

Witnesses:
HENRY E. ROEDER,
J. B. NONES.